(12) United States Patent
Dugatkin et al.

(10) Patent No.: US 7,840,664 B2
(45) Date of Patent: Nov. 23, 2010

(54) AUTOMATED CHARACTERIZATION OF NETWORK TRAFFIC

(75) Inventors: Diego Dugatkin, Thousand Oaks, CA (US); Clifford Hannel, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 1082 days.

(21) Appl. No.: 10/651,427

(22) Filed: Aug. 29, 2003

(65) Prior Publication Data

US 2004/0236866 A1 Nov. 25, 2004

Related U.S. Application Data

(60) Provisional application No. 60/472,549, filed on May 21, 2003.

(51) Int. Cl.
G06F 15/173 (2006.01)

(52) U.S. Cl. ...................................................... 709/224

(58) Field of Classification Search ................. 709/224, 709/223, 225
See application file for complete search history.

(56) References Cited

U.S. PATENT DOCUMENTS

| | | |
|---|---|---|
| 4,792,753 A | 12/1988 | Iwai |
| 5,247,517 A | 9/1993 | Ross et al. |
| 5,343,463 A | 8/1994 | van Tetering et al. |
| 5,390,314 A | 2/1995 | Swanson |
| 5,450,394 A | 9/1995 | Gruber |
| 5,477,531 A | 12/1995 | McKee |
| 5,535,338 A | 7/1996 | Krause et al. |
| 5,568,471 A | 10/1996 | Hershey et al. |
| 5,583,792 A | 12/1996 | Li et al. |
| 5,590,285 A | 12/1996 | Krause et al. |
| 5,600,632 A | 2/1997 | Schulman |
| 5,657,438 A | 8/1997 | Wygodny |
| 5,671,351 A | 9/1997 | Wild |

(Continued)

FOREIGN PATENT DOCUMENTS

WO    WO 02/056541 A3    7/2002

OTHER PUBLICATIONS

IxExplorer User's Guide. Revision 2.1.0. IXIA Communications. Nov. 1, 1999.*

(Continued)

*Primary Examiner*—Asad M Nawaz
*Assistant Examiner*—John M MacIlwinen
(74) *Attorney, Agent, or Firm*—SoCal IP Law Group LLP; Steven C. Sereboff; Mark A. Goldstein

(57) ABSTRACT

Automated characterization of network traffic. A method may include compiling and/or receiving network traffic data based on the network traffic, preparing a network traffic characterization based on the network traffic data, and generating outgoing network traffic scripts based on the network traffic characterization. A method may also include capturing network traffic and generating test network traffic based on the scripts. A system on which the method may be executed may include one or more chassis and/or computing devices, each having one or more network cards. The chassis and/or computing devices may be connected to one or more networks and to one another. The networks may include a production network and a test network. A system may include a data collector, a characterization engine, and a script generator, and may also include a traffic generator.

60 Claims, 13 Drawing Sheets

U.S. PATENT DOCUMENTS

| | | | |
|---|---|---|---|
| 5,751,963 A * | 5/1998 | Umetsu | 709/223 |
| 5,761,486 A | 6/1998 | Watanabe et al. | |
| 5,787,147 A | 7/1998 | Gundersen | |
| 5,787,253 A | 7/1998 | McCreery et al. | |
| 5,822,520 A | 10/1998 | Parker | |
| 5,838,919 A | 11/1998 | Schwaller et al. | |
| 5,850,386 A | 12/1998 | Anderson et al. | |
| 5,850,388 A * | 12/1998 | Anderson et al. | 370/252 |
| 5,854,889 A | 12/1998 | Liese | |
| 5,878,032 A | 3/1999 | Mirek et al. | |
| 5,905,713 A | 5/1999 | Anderson et al. | |
| 5,974,237 A | 10/1999 | Shurmer et al. | |
| 5,974,457 A * | 10/1999 | Waclawsky et al. | 709/224 |
| 5,978,940 A | 11/1999 | Newman | |
| 5,982,852 A | 11/1999 | Schwartz | |
| 6,031,528 A | 2/2000 | Langfahl, Jr. | |
| 6,044,091 A | 3/2000 | Kim | |
| 6,108,800 A | 8/2000 | Asawa | |
| 6,122,670 A | 9/2000 | Bennett et al. | |
| 6,148,277 A | 11/2000 | Asava | |
| 6,172,989 B1 | 1/2001 | Yanagihara et al. | |
| 6,173,333 B1 | 1/2001 | Jolitz | |
| 6,189,031 B1 | 2/2001 | Badger | |
| 6,222,825 B1 | 4/2001 | Mangin | |
| 6,233,256 B1 | 5/2001 | Dieterich et al. | |
| 6,279,124 B1 | 8/2001 | Brouwer | |
| 6,295,557 B1 | 9/2001 | Foss | |
| 6,317,788 B1 * | 11/2001 | Richardson | 709/224 |
| 6,321,264 B1 | 11/2001 | Fletcher | |
| 6,345,302 B1 | 2/2002 | Bennett et al. | |
| 6,363,056 B1 | 3/2002 | Beigi et al. | |
| 6,430,617 B1 * | 8/2002 | Britt et al. | 709/224 |
| 6,446,121 B1 | 9/2002 | Shah | |
| 6,507,923 B1 | 1/2003 | Wall et al. | |
| 6,526,259 B1 | 2/2003 | Ho | |
| 6,545,979 B1 | 4/2003 | Poulin | |
| 6,601,020 B1 | 7/2003 | Myers | |
| 6,678,246 B1 | 1/2004 | Smyth | |
| 6,717,917 B1 | 4/2004 | Weissberger et al. | |
| 6,826,259 B2 | 11/2004 | Hoffman | |
| 6,845,352 B1 | 1/2005 | Wang | |
| 7,099,438 B2 | 8/2006 | Rancu et al. | |
| 7,123,616 B2 | 10/2006 | Weissberger et al. | |
| 7,143,159 B1 * | 11/2006 | Grace et al. | 709/224 |
| 7,327,686 B2 | 2/2008 | Standridge | |
| 7,342,897 B1 | 3/2008 | Nader et al. | |
| 7,366,174 B2 | 4/2008 | MacFaden et al. | |
| 7,486,728 B2 | 2/2009 | Park et al. | |
| 7,507,948 B2 | 3/2009 | Park et al. | |
| 7,525,473 B2 | 4/2009 | Chu et al. | |
| 2001/0016867 A1 | 8/2001 | Hu | |
| 2002/0056100 A1 | 5/2002 | Shimomura et al. | |
| 2002/0105911 A1 | 8/2002 | Pruthi | |
| 2002/0138226 A1 | 9/2002 | Doane | |
| 2002/0184527 A1 * | 12/2002 | Chun et al. | 713/201 |
| 2003/0009544 A1 | 1/2003 | Wach | |
| 2003/0043434 A1 | 3/2003 | Brachmann et al. | |
| 2003/0061506 A1 * | 3/2003 | Cooper et al. | 713/201 |
| 2003/0069952 A1 * | 4/2003 | Tams et al. | 709/223 |
| 2003/0139919 A1 | 7/2003 | Sher | |
| 2003/0188003 A1 | 10/2003 | Sylvest et al. | |
| 2003/0231741 A1 | 12/2003 | Rancu et al. | |
| 2004/0111502 A1 * | 6/2004 | Oates | 709/223 |
| 2004/0111519 A1 * | 6/2004 | Fu et al. | 709/229 |
| 2004/0117474 A1 * | 6/2004 | Ginkel et al. | 709/224 |

OTHER PUBLICATIONS

European Patent Office, Supplementary Partial European Search Report; Application No. EP 0207800398, Search Report Dated Jan. 22, 2007, Munich.

Office Action dated Jan. 22, 2009 for U.S. Appl. No. 10/831,452 filed Apr. 22, 2004, 12 pp.

USPTO, Non-final Office action for U.S. Appl. No. 10/831,452, mail date Jul. 25, 2008.

Comer, Douglas E., Internetworking with TCP/IP Principles, Protocols and Architectures. Prentice Hall, 4th Edition, Chapter 7 (p. 95-113), Chapter 13 (p. 197-249), Chapter 32 (p. 581-597), Jan. 18, 2000.

Danzig, Peter B. and Sugih Jamin, tcplib: A Library of TCP Internetwork Traffic Characteristics, USC-CS-91-495, Computer Science Department, University of Southern California, Los Angeles, CA, 1991.

IXIA Communications, The Ixia 200 Traffic Generator and Analyzer, Product Description, 1997-1999.

IXIA Communications, IxExplorer User's Guide, Revision 2.1.0, Nov. 1, 1999.

Stevens, W. Richard, TCP/IP Illustrated, vol. I: The Protocols, Addison-Wesley, Jan. 31, 1994, Selections of text pp. 1-7, 21-23, 85-98.

Tannenbaum, Andrew S., Data Transmission in the OSI Model, p. 34-35, Computer Networks, Prentice Hall, 3rd Edition, Mar. 1, 1996.

Zec, Marko and Miljenko Mikuc, Real-Time IP Network Simulation at Gigabit Data Rates, Rensselear Polytechnic Institute, Mar. 2003.

Cooper, Session traces: an enhancement to network simulator, Performance, computing and Communications Conference, Scottsdale, AZ, Feb. 10, 1999.

Ye, Tao, Network Management and Control Using collaborative On-Line Simulation, Rensselaer Polytechnic Institute, 2003.

Ye, Tao, Large-Scale Network Parameter Configuration Using an On-line Simulation Framework, Technical report, ECSE Department, Rensselear Polytechnic Institute, 2002.

San-Qi Li, et al., SMAQ: A Measurement-Based Tool for Traffic Modeling and Queuing Analysis Part I, IEEE Communications Magazine, Aug. 1, 1998.

San-Qi Li, et al., SMAQ: A Measurement-Based Tool for Traffic Modeling and Queuing Analysis Part II, IEEE Communications Magazine, Aug. 11, 1998.

David Marchette, Usenix, A Statistical Method for Profiling Network Traffic, Naval Surface Warfare 1999.

European Search Report, European Patent Office, Aug. 30, 2004, C. Siebel, Berlin, App EP04253012.

* cited by examiner

| IP addresses | | Protocol Information | | | Number of Data Units | | | | | | Max size |
|---|---|---|---|---|---|---|---|---|---|---|---|
| Source | Dest | Protocol | Port/type | Flags | 0001-0063 bin 1 | 0064-0127 bin 2 | 0128-0255 bin 3 | 0256-0511 bin 4 | 0512-1023 bin 5 | 1024-1518 bin 6 | |
| | | 6: TCP | 0 | URG | | | | | | | |
| | | 6 | 0 | ACK | | | | | | | |
| | | 6 | Reg. ports: 1024-49151 | ... | | | | | | | |
| | | 6 | Dyn./priv.: 49152-65535 | ... | | | | | | | |
| | | 17:UDP | 0... 65535 | | | | | | | | |
| | | 17 | | | | | | | | | |
| | | 1: ICMP | 0... 255 | | | | | | | | |
| | | OTHER | Any | | | | | | | | |

FIG. 10

| Field | Layer-2 Protocol Type (1110) | Layer-3 Protocol Type (1112) | IP Type Of Service (1114) | Source IP Address (1116) | Destination IP Address (1118) | Min TCP port (1120) | S/D Port (1122) | Stuffing (1124) | TCP Flags (1126) | Data Unit Size [Bits] (1128) |
|---|---|---|---|---|---|---|---|---|---|---|
| Offset From Ethernet Start of Frame | | | | | | | | | | |
| 32-bit groups | 32 | | | 32 | 32 | | 32 | | | |
| Size | 16 bits | 8 bits | 8 bits | 32 bits | 32 bits | 16 bits | 1 bit | 1 bit | 6 bits | 8 bits |
| Content | 0x800 | 6 | 0 | 10.0.0.1 | 10.0.0.2 | 80 | Dest | --- | SYN | 1019 ⇔ bin #5 |
| Binary Detail | 00001000 00000000 | 00000110 | 00000000 | 00001010 00000000 00000000 00000001 | 00001010 00000000 00000000 00000010 | 00000000 01010000 | 0 | 0 | 000010 | 00000101 |

| Field | Layer-2 Protocol Type | Layer-3 Protocol Type | IP Type Of Service | Source IP Address | Destination IP Address | ICMP type & code | Unused (stuffing) | Data Unit Size [Bits] |
|---|---|---|---|---|---|---|---|---|
| Offset From Ethernet Start of Frame | 1210 | 1212 | 1214 | 1216 | 1218 | 1220 | 1222 | 1224 |
| 32-bit groups | | 32 | | 32 | 32 | 32 | | |
| Size | 16 bits | 8 bits | 8 bits | 32 bits | 32 bits | 16 bits | 8 bit | 8 bits |
| Content | xxx | 1 | 0 | 10.0.0.1 | 10.0.0.3 | 80 | Dest | 1019 ⇨ bin #2 |
| Binary Detail | xxxxxxxx xxxxxxxx ‐ ‐ ‐ | 00000001 ‐ ‐ ‐ | 00000000 ‐ ‐ ‐ | 00001010 00000000 00000000 00000001 | 00001010 00000000 00000000 00000011 | 00000000 01010000 ‐ ‐ ‐ | 00000000 ‐ ‐ ‐ | 00000100 ‐ ‐ ‐ |

1200

AUTOMATED CHARACTERIZATION OF NETWORK TRAFFIC

RELATED APPLICATION INFORMATION

This application claims the benefit of U.S. Provisional Application No. 60/472,549 filed May 21, 2003, which is incorporated herein by reference.

This application is related to U.S. Utility Patent Application entitled REAL WORLD TRAFFIC filed Aug. 21, 2003 having Ser. No. 10/646,983.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The invention relates to networks and network traffic.

2. Description of Related Art

Networks such as the Internet provide a variety of data communicated using a variety of network devices including servers, routers, hubs, switches, and other devices. Before placing a network into use, the network, including the network devices included therein, may be tested to ensure successful operation. Network devices may be tested, for example, to ensure that they function as intended, comply with supported protocols, and can withstand anticipated traffic demands.

To assist with the construction, installation and maintenance of networks and network devices, networks may be augmented with network analyzing devices, network conformance systems, network monitoring devices, and network traffic generators, all which are referred to herein as network testing systems. The network testing systems may allow for the sending, capturing and/or analyzing of network communications.

Current network traffic analysis tools and traffic generation systems exist as separate entities. Several techniques for gathering and analyzing network data exist. These techniques include direct playback of recorded data and synthetic generation of packet based traffic. Current systems do not combine statistical analysis and modeling with automatic scripting and traffic generation capabilities.

In some network testing systems, the tasks of gathering, analyzing and modeling network traffic data, creating scripts based on the network traffic data, and generating synthetic network traffic involve comprehensive human intervention. The manually intensive tasks call for highly trained personnel skilled in using a number of products. The users of current network testing systems must understand the input and output specifications of each of the separate components of the systems used throughout the testing process. The inconvenience of using several products for network testing is exacerbated by the risk of human errors at multiple instances during the testing process. The errors resulting from use of current network testing systems, the personnel needed to run and/or manage current network testing systems, and the personnel required to operate current network testing systems result in large operational costs. In addition, in simplifying current network testing systems to reduce human introduced errors and to demand less knowledge from users, the capabilities of current network testing systems have been reduced.

DESCRIPTION OF THE DRAWINGS

FIG. 10 is a network traffic summary table in accordance with the invention.

FIG. 11 is a representation vector of a TCP data unit in accordance with the invention.

FIG. 12 is a representation vector of an ICMP data unit in accordance with the invention.

DETAILED DESCRIPTION OF THE INVENTION

Throughout this description, the embodiments and examples shown should be considered as exemplars, rather than limitations on the elements claimed below.

As described herein network traffic statistical analysis and statistics gathering, network traffic modeling, network traffic script creation and/or network traffic generation are automated to reduce user involvement in and improve network testing, network device testing and network application testing. The analysis, modeling and profiling of network traffic allows for the automatic generation of network traffic scripts and/or network traffic that statistically reflects the behavior of real traffic in a network.

Environment

Figure 1:
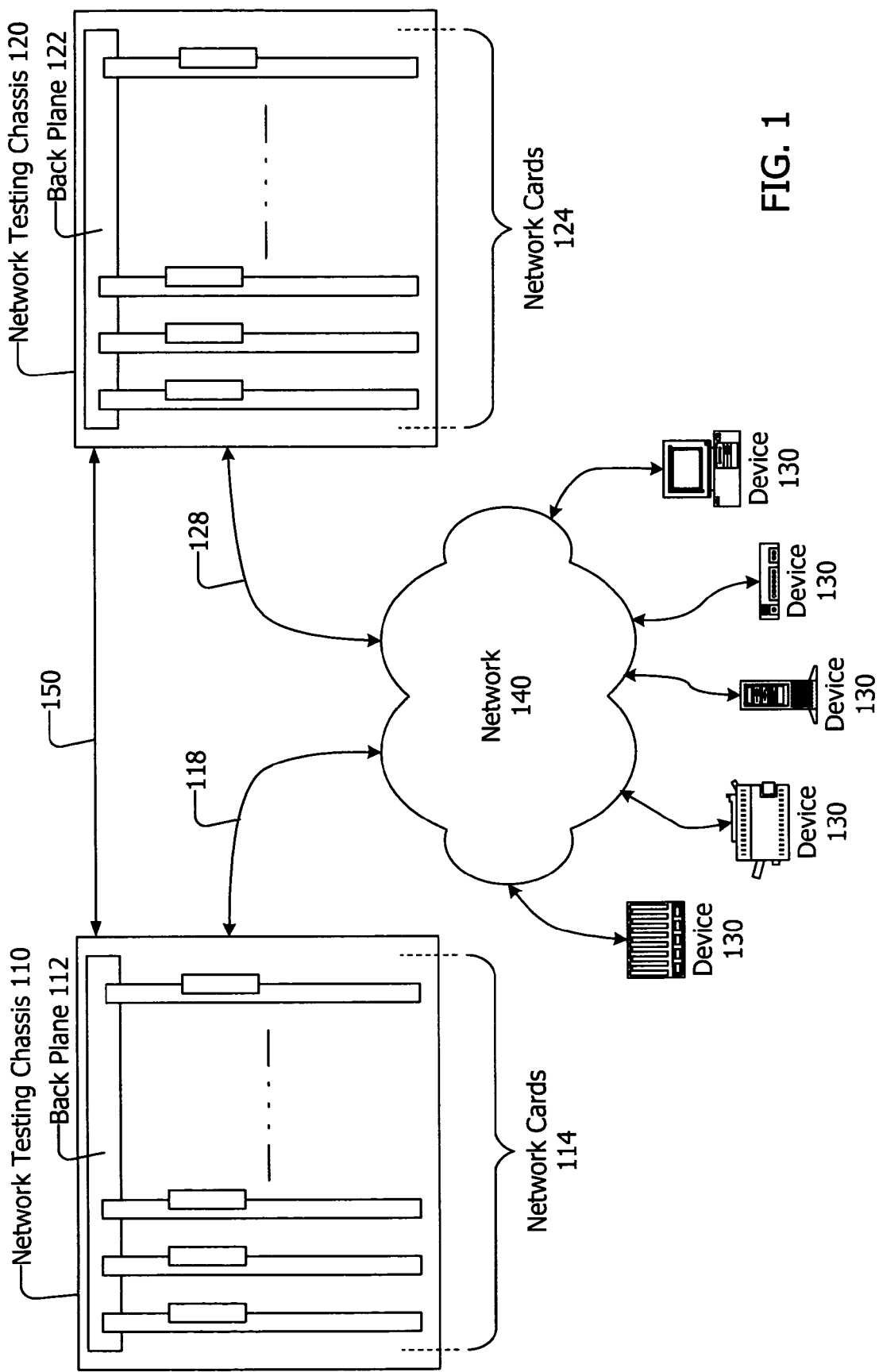
FIG. 1 is a block diagram of an environment in accordance with the invention.

Referring to FIG. 1, there is shown a block diagram of an environment in accordance with the invention. The environment includes network testing chassis 110 and 120 coupled to one another via a dedicated line or network 150, plural network capable devices 130, and a network 140 to which each of the network testing chassis may be coupled.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, and may be a segregated test network. The network 140 may be comprised of numerous nodes providing numerous physical and logical paths for data to travel.

Communications on the network 140 may take various forms, including frames, cells, datagrams, packets or other units of information, all of which are referred to herein as data units. The network testing system 100 and the network capable devices 130 may communicate simultaneously with one another, and there may be plural logical communications links between the network testing chassis 110 and 120 with a given network capable device 130. Those data units that are communicated over a network are referred to herein as network traffic.

The network testing chassis 110 and 120 may include or be one or more of a traffic generator, a performance analyzer, a conformance validation system, a network analyzer, a network management system, and/or others. The network testing chassis may include an operating system such as, for example, versions of Linux, Unix and Microsoft Windows. The network testing chassis 110 and 120 may include one or more network cards 114 and 124, and back plane 112 and 122. The network testing chassis 110 and 120 and/or one or more of the network cards 114 and 124 may be coupled to network 140 via one or more connections 118 and 128. Connections 118 and 128 may be wired or wireless. The network testing chassis 110 and 120 may be coupled for communication directly to one another over line 150. The network testing chassis 110 and 120 may also communicate with one another over network 140.

The network testing chassis 110 and 120 may be in the form of a card rack, as shown in FIG. 1, or may be an integrated unit. Alternatively, each of the network testing chassis may comprise a number of separate units cooperating to provide traffic generation, traffic and/or network analysis, network conformance testing, and other tasks.

The network testing chassis 110 and 120 and the network cards 114 and 124 may support one or more well known higher level communications standards or protocols such as, for example, the User Datagram Protocol (UDP), Transmission Control Protocol (TCP), Internet Protocol (IP), Internet Control Message Protocol (ICMP), Hypertext Transfer Protocol (HTTP), address resolution protocol (ARP), reverse address resolution protocol (RARP), file transfer protocol (FTP), Simple Mail Transfer Protocol (SMTP); and may support one or more well known lower level communications standards or protocols such as, for example, the 10 Gigabit Ethernet standard, the Fibre Channel standards, and one or more varieties of the IEEE 802Ethernet standards, Asynchronous Transfer Mode (ATM), X.25, Integrated Services Digital Network (ISDN), token ring, frame relay, Point to Point Protocol (PPP), Fiber Distributed Data Interface (FDDI), may support proprietary protocols, and may support other protocols.

The term network card encompasses line cards, test cards, analysis cards, network line cards, load modules, interface cards, network interface cards, data interface cards, packet engine cards, service cards, smart cards, switch cards, relay access cards, CPU cards, port cards, and others. The network cards may be referred to as blades. The network cards 114 and 124 may include one or more computer processors, field programmable gate arrays (FPGA), application specific integrated circuits (ASIC), programmable logic devices (PLD), programmable logic arrays (PLA), processors and other kinds of devices. The network cards may include memory such as, for example, random access memory (RAM). In addition, the network cards 114 and 124 may include software and/or firmware.

At least one network card 114 and 124 in each of the network testing systems 110 and 120 may include a circuit, chip or chip set that allows for communication over a network as one or more network capable devices. A network capable device is any device that may communicate over network 140.

The network cards 114 and 124 may be connected to the network 140 through one or more connections 118 and 218 which may be wire lines, optical fiber cables, wirelessly and otherwise. Although only one each of connections 118 and 218 are shown, multiple connections with the network 140 may exist from the network testing chassis 110 and 120 and the network cards 114 and 124. Each network card 114 and 124 may support a single communications protocol, may support a number of related protocols, or may support a number of unrelated protocols. The network cards 114 and 124 may be permanently installed in the network testing systems 110 and 120, may be removable, or may be a combination thereof. One or more of the network cards 114 and 124 may have a resident operating system included thereon, such as, for example, a version of the Linux operating system. Each of the network testing chassis 110 and 120 may include a CPU card that allows the chassis to also serve as a computer workstation.

The back planes 112 and 122 may serve as a bus or communications medium for the network cards 114 and 124. The back planes 112 and 122 may also provide power to the network cards 114 and 124.

The network capable devices 130 may be any devices capable of communicating over the network 140. The network capable devices 130 may be computing devices such as workstations, personal computers, servers, portable computers, personal digital assistants (PDAs), computing tablets, and the like; peripheral devices such as printers, scanners, facsimile machines and the like; network capable storage devices including disk drives such as network attached storage (NAS) and SAN devices; and networking devices such as routers, relays, firewalls, hubs, switches, bridges, traffic accelerators, and multiplexers. In addition, the network capable devices 130 may include appliances such as refrigerators, washing machines, and the like as well as residential or commercial HVAC systems, alarm systems, and any other device or system capable of communicating over a network. One or more of the network capable devices 130 may be devices to be tested and may be referred to as devices under test.

Each of network testing chassis 110 and 120 as well as one or more of the network cards 114 and 124 may include software that executes to achieve the techniques described herein. As used herein, the term software involves any instructions that may be executed on a computer processor of any kind. The software may be implemented in any computer language, and may be executed as object code, may be assembly or machine code, a combination of these, and others. The term application refers to one or more software modules, software routines or software programs and combinations thereof. A suite includes one or more software applications, software modules, software routines or software programs and combinations thereof. The techniques described herein may be implemented as software in the form of one or more applications and suites and may include lower level drivers, object code, and other lower level software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is any device that allows for the reading from and/or writing to a machine readable medium.

The network testing chassis 110 and 120 may each be augmented by or replaced by one or more computing devices having network cards included therein, including, but not limited to, personal computers and computer workstations.

Figure 2:
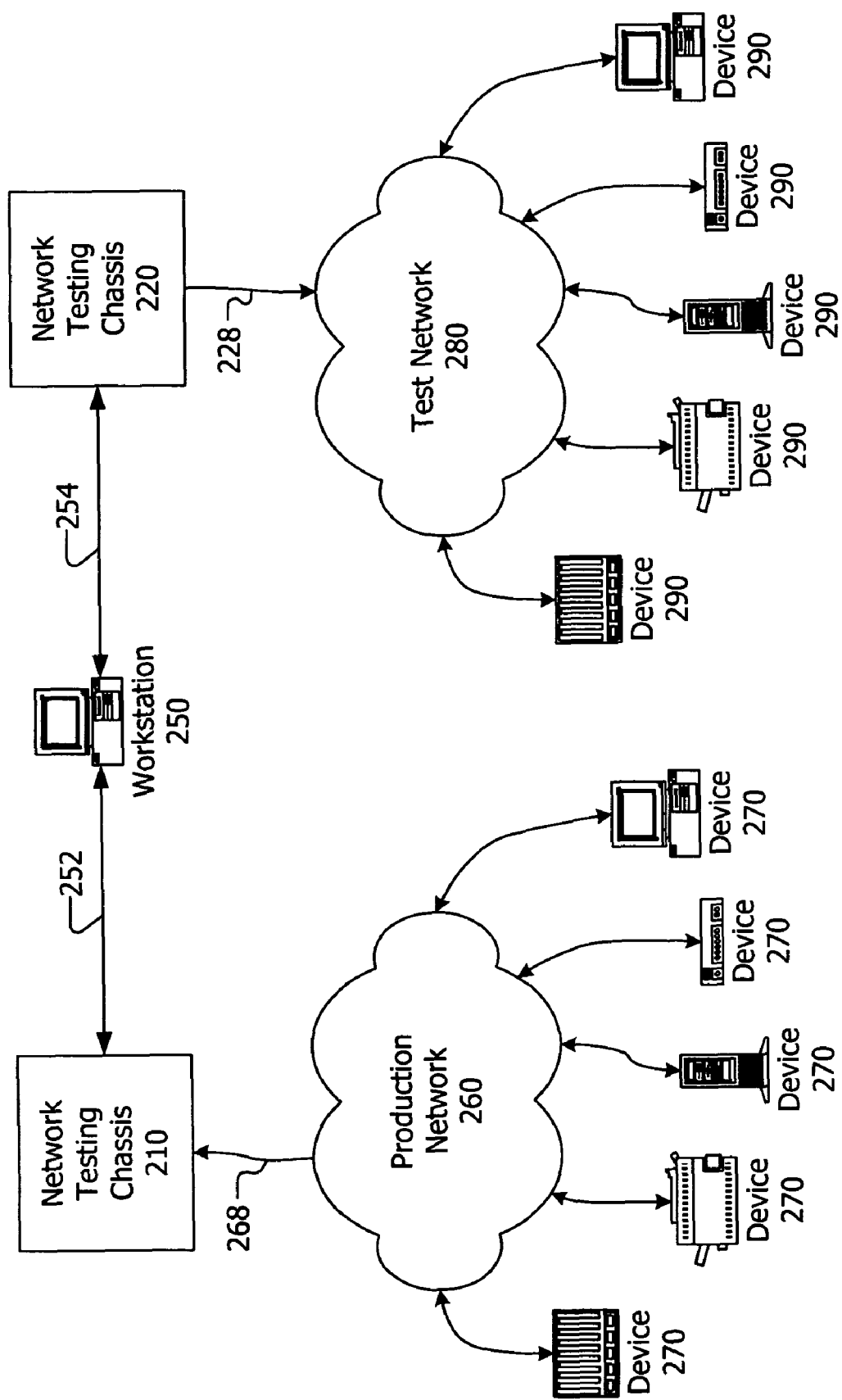
FIG. 2 is a block diagram of a second environment in accordance with the invention.

FIG. 2 is a block diagram of a second environment in accordance with the invention. Network testing chassis 210 and 220 may be coupled via dedicated communication lines 252 and 254 with a computer workstation 250. The computer workstation 250 may be any computing device. The computer workstation 250 may include a storage device to access a storage medium on which software that implements the techniques described herein is stored. The software that implements the techniques described herein may be downloaded from the workstation 250 to each of network testing chassis 210 and 220 and the network cards included therein. The workstation 250 may be located physically adjacent to or remote to network testing chassis 210 and 220. Similarly, network-testing chassis 210 and 220 may be located physically adjacent to or remote to one another.

Network testing chassis 210 may be coupled to a production network 260 via one or more connections 268. The term "production network" as used herein means a network that is up and running in the regular course of business. As such, a production network includes network traffic emanated from and between end users and other client devices and servers such as web servers and application servers, as well as other network capable devices 270 attached to or otherwise communicating over production network 260. Network testing chassis 210 may listen to the traffic on and capture or review network traffic from production network 260.

Network testing chassis 220 may be coupled to a test network 280 via one or more connections 228. The term "test network" as used herein means any network that is to be tested, including private segregated networks and publicly accessible networks. The test network 280 may include one or more network capable devices 290 which may be tested and may be referred to as devices under test. Network testing chassis 220 may send or otherwise transmit or communicate data units directed to network capable devices 290 over test network 280.

Each of the network testing chassis 210 and 220 may include a CPU card that allows the chassis to serve as a computer workstation. Storage devices and storage media such as hard disk drives may be included in testing chassis 210 and 220 and included on and/or coupled to the chassis, the CPU cards and/or network cards included therein.

Figure 3:
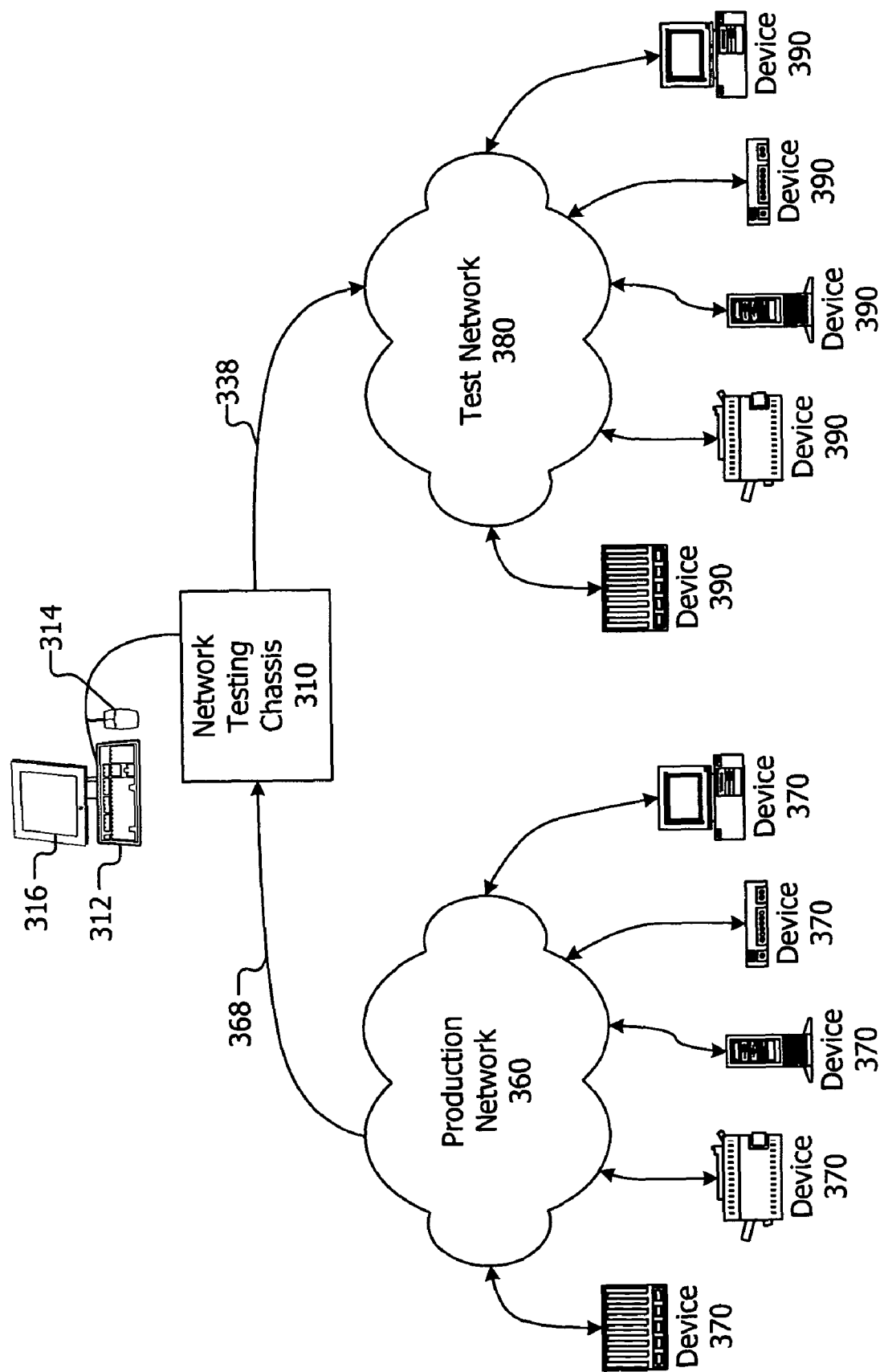
FIG. 3 is a block diagram of a third environment in accordance with the invention.

FIG. 3 is a block diagram of a third environment in accordance with the invention. Network testing chassis 310 may be coupled via communication line 368 to receive, review and/or capture network traffic from devices 370 on production network 360. The network testing chassis 310 may be coupled via communication line 338 to transmit network traffic to devices 390 on test network 380.

The network testing chassis 310 may have included therewith a display 316 and user input devices such as keyboard 312 and mouse 314, as well as other user input devices including, for example, pens and trackballs, all of which may be coupled to a CPU card included in the chassis. A hard disk drive or other storage device may be included in network testing chassis 310 to store software that implements the techniques described herein. The software that implements the techniques described herein may be communicated from the CPU card to the network cards included in the network testing chassis 310. The network testing chassis 310 may be located physically adjacent to or remote to the devices 370 in the production network 360 and devices 390 in the test network 380.

Overview

Figure 4A:
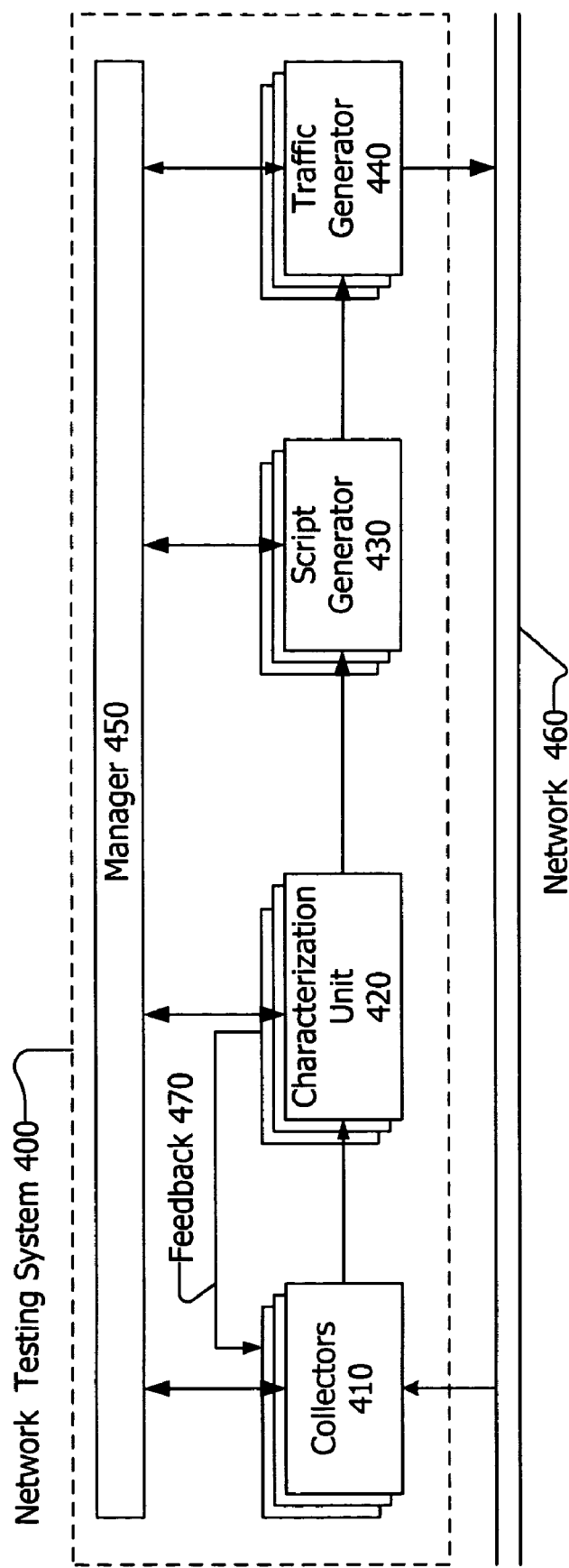
FIG. 4A is a functional block diagram of operating units in accordance with the invention.
Figure 4B:
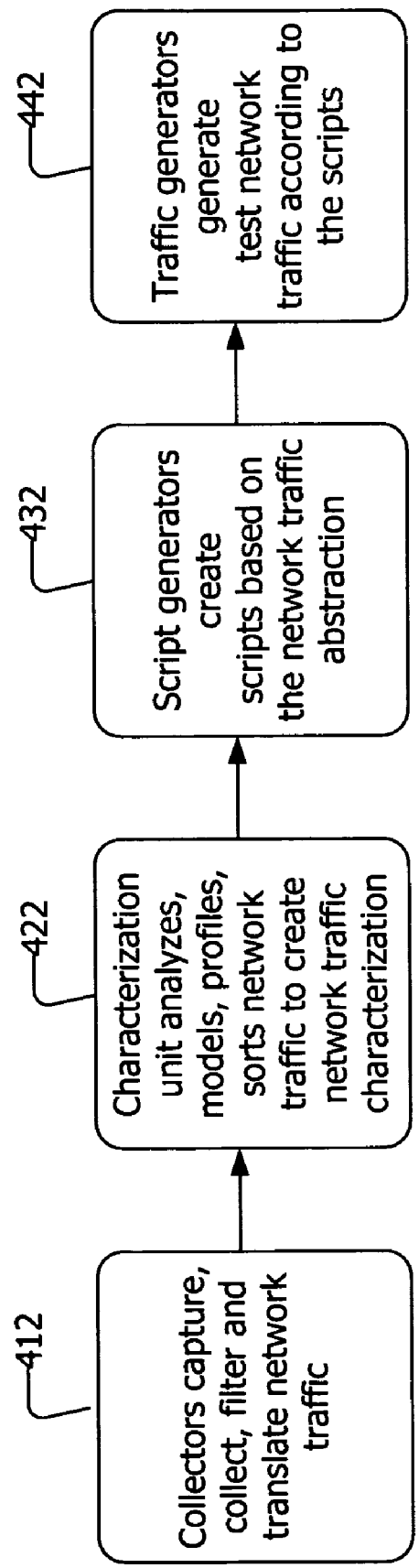
FIG. 4B is a flowchart of the actions taken by the operating units shown in FIG. 4.

FIG. 4A is a functional block diagram of operating units in accordance with the invention. FIG. 4B is a flow chart of the actions taken by the operating units shown in FIG. 4A in accordance with the invention. A network testing system 400 may include collectors 410 to capture, collect, filter and perform other operations on network traffic collected from network 460, as shown in block 412. The collectors may compile network traffic data. The collectors may be coupled to and pass collected and filtered network traffic to the characterization unit 420. The characterization unit 420 may analyze, model, profile, sort and perform other operations on the collected and filtered network traffic and/or the network traffic data to create a network traffic characterization, as shown in block 422.

Feedback 470 may be used by the characterization unit 420 to request that the collectors 410 collect additional kinds or types of data concerning specific kinds or types of network traffic. The characterization unit 420 may, based on analysis of the network traffic data, automatically adjust the network traffic data collected and compiled by the collectors 410. That is, the characterization unit 420 may request via feedback 470 that the collectors 410 collect or maintain additional information concerning the network traffic. The characterization unit 420 may also request via feedback 470 that the collectors 410 limit the information collected to information concerning specified kinds or types of the network traffic. As the characterization unit 420 learns additional information about the network traffic, the characterization unit 420 may via feedback 470 successively request more detailed information about more limited sets or kinds of data units.

The characterization unit 420 may be coupled to a script generator 430. The script generator 430 may create traffic transmission scripts based on the network traffic characterization, as shown in block 432. The script generator 430 may be coupled to traffic generator 440. The traffic generator 440 may generate test network traffic onto network 460 according to the scripts created by the script generator 430, as shown in block 442. The test network traffic may be used to test network capable devices coupled with or otherwise accessible by network 460 and to test software included on the network capable devices, including application software.

A manager 450 may be coupled to each of the collectors 410, characterization unit 420, script generator 430 and traffic generator 440. The manager 450 may provide a user interface by which a user may access information concerning the collected network traffic and network traffic data, the scripts and other information made accessible to users by each of the other components. In addition, the manager 450 may provide a user an interface to define the kinds or types of network traffic the collectors 410 may collect and filter, may allow a user to edit or augment the network traffic characterization, may allow a user to edit or augment the scripts generated by the compiler 430, and may allow a user to perform other tasks.

In addition, the manager 450 may query the traffic generator 440 to learn the capabilities of the traffic generator 440. Based on the traffic generating capabilities of the traffic generator 440, the manager 450 may provide initial settings and otherwise control the scope, breadth and depth of the network traffic and network traffic data sought, collected and captured by the collectors 410 of the network traffic. The manager may also control the scope, breadth and depth of the scripts generated by the script generator 430 based on the capabilities of the traffic generator 440.

Figure 5:
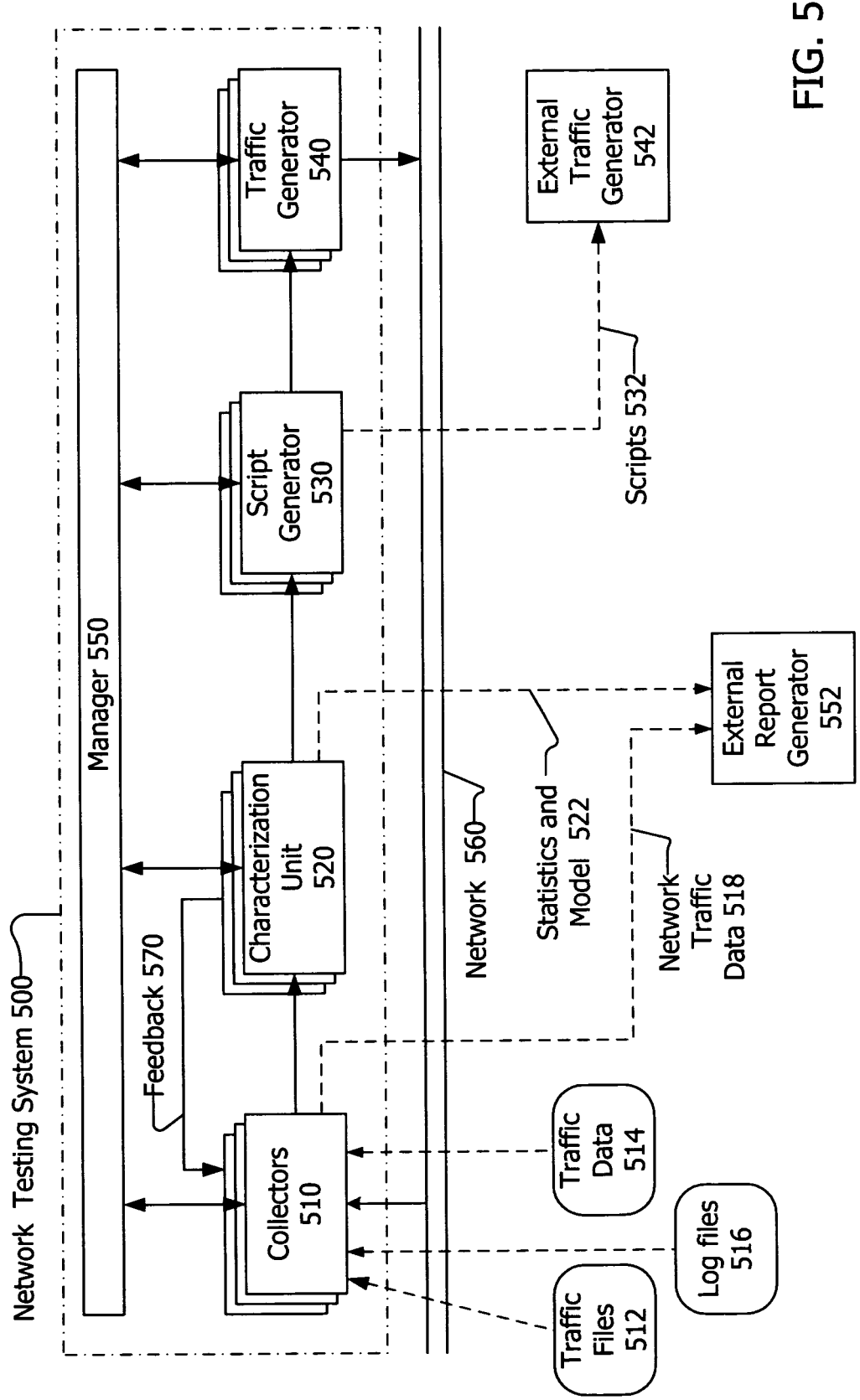
FIG. 5 is a second functional block diagram of operating units in accordance with the invention.

FIG. 5 is a second functional block diagram of operating units in accordance with the invention. Collectors 510 may capture and collect network traffic from network 560. Collectors 510 may also receive network traffic files 512 and/or network traffic data 514 from other collectors (not shown) external to network testing system 500 which may be local or remote network testing systems, packet sniffers, and other devices and systems. The external collectors may provide traffic files 512 that include data units from a capture group of network traffic, and may provide traffic data 514 for data units from a capture group of network traffic. In addition collectors 510 may receive and/or retrieve log files from local or remote network testing systems, and network capable devices, including serves, routers, gateways and others. The collectors 510 may obtain access to the log files 516 by presenting a password or other means of authenticating access to the log files. Collectors 510 may be replaced by external collectors (not shown) which pass network traffic files 512, network traffic data and/or log files 516 directly to characterization unit 520.

The collectors 510 may prepare network traffic data and pass the network traffic data to a characterization unit 520. The collectors 510 may also pass or otherwise make available the network traffic data 518 to an external report generator 552 that may be located local or remote to the network testing system 500. The external report generator 552 may be a software program running on a computing device that may be or include a network testing system. The external report generator 552 may allow a user such as a network testing administrator to view the network traffic data via a graphical user interface or other user interface.

The characterization unit 520 may receive the network traffic data from the collectors 510 and prepare a network traffic characterization 522 that includes network traffic statistics and a network traffic model. The characterization unit 520 may pass or otherwise make available the network traffic characterization to the script generator 530. In addition, the characterization unit 520 may pass or otherwise make available the network traffic characterization 522 to the external report generator 552. The external report generator 552 may allow a user such as a network testing administrator to view the network traffic characterization via a graphical user interface or other user interface.

The characterization unit 520 may also control and define the type and kind of filters used in collectors 510. By doing so, the characterization unit 520 may refine the scope, breadth and depth of the network traffic and network traffic data collected, captured and reviewed by the collectors 510. As above with regard to characterization unit 420 and feedback 470, feedback 570 may be used by the characterization unit 520 to request that the collectors 510 collect data concerning specific kinds or types of network traffic. The characterization unit 520 may, based on analysis of the network traffic data, use feedback 570 to automatically adjust the network traffic data collected and compiled by the collectors 510. As the characterization unit 520 learns additional information about the network traffic, the characterization unit 520 may via feedback 570 successively request more detailed information about more limited sets or kinds of data units in the network traffic.

The script generator 530 may create network traffic generation scripts based on the network traffic characterization. The script generator may pass or otherwise make available the network traffic generation scripts 532 to the traffic generator 540 included in network testing system 500. The traffic generator 540 may, based on the network traffic generation scripts, prepare and transmit outgoing network traffic onto network 560. The script generator may also pass or otherwise make available the network traffic generation scripts 532 to an external traffic generator 542, which may be located local or remote to the network testing system 500. The external traffic generator 542 may be a software program running on a computing device that may be or include a network testing system. The traffic generator 540 may be replaced by or augmented by the external traffic generator 542. The external traffic generator 542 may, based on the network traffic generation scripts 532, prepare and transmit outgoing network traffic onto network 560 independent of traffic generator 540.

Systems

Figure 6:
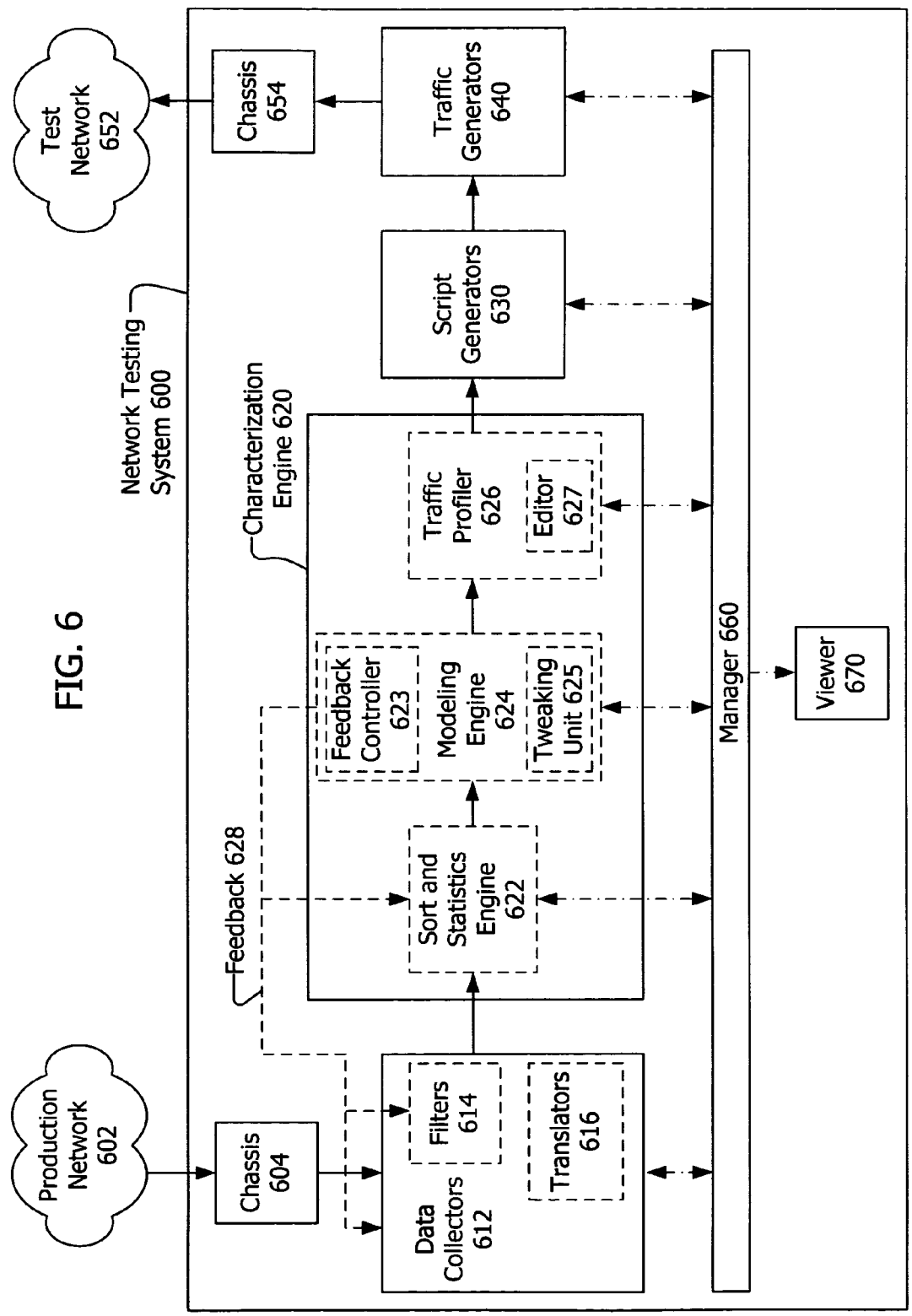
FIG. 6 is a block diagram of a network testing system in accordance with the invention.

FIG. 6 is a block diagram of a network testing system 600 in accordance with the invention. The network testing system 600 may be coupled between a production network 602 and a test network 652. The network testing system may include incoming production network traffic chassis 604 and outgoing test network chassis 654. Network cards included in one or more of chassis 604 and 654 may execute software to achieve the functionality of the network testing system 600. The functional units of the network testing system 600 may include one or more data collectors 612, a characterization engine 620, script generators 630, traffic generators 640 and a manager 660.

Data collectors 612 review network traffic to gather network traffic data regarding the network traffic on the production network 602. The data collectors may review, capture and otherwise obtain network traffic and network traffic data in capture groups. As used herein, a capture group is a group of data units or network traffic data concerning the data units which may be collected either over a system defined period of time (e.g., 3 minutes, 30 minutes, 3 hours), until a memory storage area is full, or until a user or system specified threshold has been reached.

The network traffic data may include protocol distribution data, length distribution data, transaction distribution data, header information, and payload data culled from the collected network traffic.

The protocol distribution data may enumerate the protocols that are present in the collected network traffic. A raw count of data units for each of a group of protocols may be maintained to compile the protocol distribution data. A simple histogram may be presented via viewer 670 of manager 660 to graphically show the protocol distribution of network traffic. Protocol distribution data compilation may involve multi-segment analysis such as iterative passes or iterative collection of multiple capture groups to evaluate the proportion of network traffic that is communicated according to various data communications protocols.

The length distribution data may be compiled for each protocol, for certain size data units, for certain rate or speed characteristics of data units collected in the network traffic. The transaction distribution data may be compiled based on a count of the most popular kinds or types of transactions that are included in the data units that comprise the collected network traffic. For example, the N most common transaction data units may be counted for one or more protocol data units, where N is 4, 8, 10, 16, 20, 32, or any other number. Header information such as source or destination addresses, port designations, and other header data may be counted or maintained such that the most common addresses, ports or most common header information is maintained. Payload data may also be maintained to categorize the different network applications that are represented by the network traffic. The data collectors 612 may maintain a count of the most common network applications. Data units having a specified combination of header and/or payload attributes may be maintained.

To assist with the statistical profiling of network traffic by the characterization engine 620, the data collectors 612 may capture network traffic from the production network 602 and count in real time the numbers of data units, the number of bytes per data unit, and maintain other raw data concerning the network traffic. Data collectors 612 may perform network traffic data gathering directly at the kernel level, in hardware such as FPGAs and in firmware. This provides for fast collection of network traffic data. Real-time data collection may be used to generate statistically relevant information on the fly, at or close to line rate. As used herein, line rate means the speed at which the network traffic travels on a physical or PHY layer on which it is being communicated. Wire speed is a synonym for line rate.

The data collectors 612 may be comprised of one or more units, systems or plug-in modules, each of which may specialize in obtaining data concerning different kinds of data units that comprise the network traffic. Multiple data collection units may be used to increase the richness of collected network traffic and the network traffic data culled from the collected network traffic and/or to increase the performance of the data collectors 612. In some circumstances, a first data collection unit may be used initially to determine the traffic mix, and multiple specialized data collection units may be applied in sequence. The multiple specialized data collection units may each focus on data units that have particular characteristics, such as network layer protocol, application, destination address, and others. Multiple data collectors 612 may also be applied in parallel or concurrently to review the contents of different kinds of data units, or to review different portions of the same kinds of data units.

Using multiple data collection units may increase the overall complexity of the system. A single data collection unit may gather sufficient information to yield the statistics. A single data collection unit may also be used for simplicity.

The data collectors 612 may use one or more specialized network cards with data unit scanners to gather raw statistics about the data units included in the network traffic on production network 602. The data unit scanners may be implemented at the operating system level, in hardware such as FPGAs, and in firmware. The data unit scanners allow the data collectors 612 to gather multiple characteristics of the data units included in the network traffic simultaneously, at or close to line rate. These multiple characteristics of the network traffic may be used to increase the breadth and/or depth of the statistics to be computed by the sort and statistics engine 622 and to increase the accuracy of the modeling of the network traffic by the modeling engine 624.

The filters 614 and translators 616 may be included with the data collectors 612. When the data collectors 612 include multiple data collection units, each of the data collection units may present output in differing formats. Translators 616 may be included with the data collectors 612 to convert the network traffic data into a uniform format. The uniform format network traffic data may be passed to the characterization engine 620 to which the data collectors 612 are coupled.

The translators 616 included with the data collectors 612 may be applied when a data unit in the production network 602 uses secure protocols, such as, for example, IP Security (IPSec), secure sockets layer (SSL), transport layer security (TLS), and others. The translators 616 may extract the encrypted information, and translate it appropriately.

The filters 614 may be system defined and/or user-defined. The filters 614 may be used for various purposes, such as, for example, to restrict the collected network traffic based on the source or destination addresses, the protocols, or any other data fields specified in the data units. The filters 614 used may be derived from the capabilities of the traffic generators 640. The filters 614 may limit network traffic collection to those kinds or types of data units that the traffic generators 640 are capable of transmitting. The kinds and types of filters 614 included in or active in the data collectors 612 may be controlled by the manager 660 based in part on the capabilities of the traffic generators 640. The filters 614 may also be used to limit data collection to specific network traffic patterns.

The manager 660 may provide an interface to allow a user to create and/or modify filters to be used by the data collectors 612. This may be achieved by the manager 660 providing a user interface to a user via a computer terminal or other computing device. The user interface may also be provided by or in conjunction with the data collectors 612.

The manager 660 may also provide an interface that allows users the ability to view the content of log files or other fields containing network traffic related data on remote servers, routers, and other network devices. The log files that may be viewable include server logs, routing tables and logs, and others. To achieve this access the manager 660 and/or the network testing system 600 may use a password or other authentication means to obtain permission to view the logs on servers, routers, and other network devices.

The characterization engine 620 may include a sort and statistics engine 622, a modeling engine 624, and a traffic profiler 626. The sort and statistics engine 622 may receive network traffic data and basic statistics (e.g., raw count of data units, raw count of data units of particular protocol types, etc.) concerning network traffic in a standardized format from the data collectors 612, and may create a set of network traffic statistics.

The sort and statistics engine 622 may pass the network traffic statistics to the modeling engine 624, and may also pass them to the manager 660. The sort and statistics engine 622 may gather statistics, provide traffic data analysis, and generate user readable reports that may be web-accessible.

The sort and statistics engine 622 may provide an interface to the manager 660 or other external components such as network protocol analyzers to allow a user to examine network traffic statistics in real-time or otherwise. This interface may be provided by or augmented by using libpcap or tcpdump for TCP-like types of traffic. The sort and statistics engine 622 may provide an interface to the manager 660 to allow users to view application layer information.

The modeling engine 624 may create a description of a single capture group or of multiple capture groups of network traffic in the form of a model. The mathematical representation of the observed traffic patterns as a model provides a characterization of the captured network traffic. The input to the modeling engine 624 is the series of assembled network traffic statistics from the sort and statistics engine 622. The statistics may be passed in a file such that only a file name need be passed from the from the sort and statistics engine 622 to the modeling engine 624.

The output of the modeling engine 624 is a model that may be represented as collection of parameters compiled from the network traffic statistics. The parameters include any statistics or other information concerning or derived from the network traffic data, including mean standard deviation, and others regarding addresses, protocols, flags, data unit size, payload size, application included in the data unit, and others. The modeling engine 624 distils a parameterized model that characterizes the traffic based on the network traffic statistics. The modeling engine 624 passes the parameterized model to traffic profiler 626. The modeling engine 624 may report the parameterized model to a user via the manager 660. The modeling engine 624 may allow users to modify the parameterized model via manager 660.

The modeling engine may include a feedback controller 623 to control via feedback 628 the kind and type of information included in the network traffic data by the data collectors 612 and the filters 614, and the scope, breadth and depth of the information compiled and computed by the sort and statistics engine 622. For example, the feedback controller 623 may successively refine the information to be retrieved regarding the network traffic by first requesting all transport layer (layer 3) data units, then requesting all TCP data units, then requesting all HTTP data units, and so on. In this way, the granularity of network traffic data captured, collected and analyzed by the data collectors, the filters 614, and the sort and statistics engine 622 may be increased in successive capture groups Other successive refining may be achieved based on system defined and/or user defined instructions included in or provided to the feedback controller 623.

The modeling engine 624 may include a model tweaking unit 625 that allows users to adjust the various variables and parameters included in the parameterized model representation process of real traffic.

The modeling engine 624 may sanitize all of the information it maintains regarding the network traffic by removing all private and sensitive information from the data. For example, private and sensitive data such as passwords, user names, banking information, credit card numbers, social security numbers, etc. may be removed by the modeling engine 624. The modeling engine 624 may also remove any other identifying information from the network traffic data and the network traffic model, including, for example, IP addresses, port numbers, payload data, and others.

The modeling engine 624 may construct a parameterized model of network traffic that describes the characteristics of the observed traffic. The parameterized model may be limited to a particular layer of the network. This may be, for example, at layer 7 of the network, which may be application layer, at layer 3 of the network which may be the network layer, and so on. Multiple layers of network traffic may be parameterized, such as for example, layers 3, 4 and 7 of the OSI model, namely the network, transport, and applications layers.

In implementing the modeling engine 624, the level of detail, and the number of degrees of freedom to be used in the preparing the parameterized model of the network traffic may be influenced by the capabilities of the network testing system 600. The ability of the network testing system to generate traffic with current and future hardware, as well as software running on current and future devices may be taken into account when selecting the number of parameters and corresponding levels of accuracy to be referenced by the modeling engine 624. That is, the kinds and types of parameters included in the parameterized model of network traffic by the modeling engine 624 may be controlled by the manager 660 based in part on the capabilities of the traffic generators 640.

The modeling engine 624 may prepare different kinds of parameterized models including basic models, mathematical models, and others.

A basic model may include the distribution of protocols in the network traffic and a select group of specific fields (and/or sub-fields) in the data units of the network traffic for each source address in the data units included in the network traffic. The basic model may also describe the traffic coming from specific points in the network. An example basic model may include, for a given source address, the number of outgoing transport layer or IP packets, the multivariate distribution of IP-protocol, ports, flags, etc, together with packet-size distribution. Another, basic model approach may involve describing the statistics for each user in which statistics concerning all the packets emanating from a single source address may be kept.

A mathematical model may be obtained by using a polynomial representation for the mix of network traffic. Any of a variety of curve fitting techniques may be used to create an expression of the mix of network traffic as a polynomial equation. The polynomial representation for the mix of network traffic may be created using Pareto distribution, Gaussian distribution, decaying exponential distribution, and other techniques. Multiple mathematical models may be used to express various attributes of the network traffic, including, for example, data unit size distribution, data units over time, data unit layer distribution, applications included in data unit distribution, data unit protocol distribution, and others. A complex mathematical model may take into account multiple attributes of the network traffic.

The traffic profiler 626 receives a network traffic model in the form of parameters from the modeling engine 624. The traffic profiler 626 matches the model generated by the modeling engine 624 with pre-defined traffic patterns in the form of traffic archetypes. The traffic profiler 626 may create a traffic profile schema based on the comparison of the parameterized model with the available traffic archetype mixes. There are many potential traffic mixes that may be pre-defined as traffic archetypes including, for example, financial mix, manufacture mix, Internet backbone mix, and other patterns. Additional traffic archetypes may be obtained from volunteering customers, from studies, and from other sources. A benefit of providing a collection of traffic archetypes includes the ability of the network testing system to quickly approximate the network traffic mix by using a corresponding archetype for the corresponding industry segment or network type of a user.

The traffic profiler 626 may include a profile editor 627. The profile editor 627 may allow users to modify and adjust traffic archetypes and the traffic profile schema to better represent traffic mixes and variations in network traffic profiles.

The script generators 630 receive the traffic profile schema created by traffic profiler 626 and generate scripts that will be used by the traffic generators 640 to generate network traffic. The script generators 630 may include one or more plug-ins, modules or sub-units that each contain a separate individual compiler. Each script generating compiler may create a specific type of script to generate a particular kind of network traffic. The script generator plug-ins may specialize in preparing scripts for various kinds of network traffic, including, for example, stateless streams such as TCP and HTTP, perfstack and fullstack, and others. Script generator plug-ins may be added or removed. There may be one script generating compiler for each supported network communications protocol.

The traffic generators 640 receive as input the generated aggregation of scripts prepared by the script generators 630. The traffic generators 640 may produce as output network traffic in the form of a single sequence of data units described by the scripts. The single sequence of network traffic may be a single stream. A stream may be any series of related packets. The single sequence of network traffic is transmitted into the test network 652.

The traffic generators 640 may also generate multiple sequences and multiple steams of data units. The traffic generators 640 may include a scheduler such as a stream multiplex scheduler. The scheduler may multiplex the various streams or other groupings of data units that represent the different types of network traffic modeled by the scripts. The scheduler may coordinate any number of streams or other groupings of network traffic; for example, 160 separate streams may be aggregated as the generated network traffic.

If the number of data unit types is greater than a system defined maximum, such as for example, 128, 160, 256, and others, the scripts may be analyzed such that the number of data unit types is reduced, thus reducing the resolution of the test network traffic. That is, fewer types of data units than the types included in the scripts will be transmitted.

The manager 660 may generate reports, graphics, and charts describing the incoming network traffic data unit mix, the overall throughput of the production network 602, application throughput seen on the production network 602, and other characteristics of the production network 602 and the network traffic that populates the production network 602.

The manager 660 may receive information from multiple sources, such as one or more of the data collectors 612, the sort and statistics engine 622, the modeling engine 624 and the traffic profiler 626. The manager 660 may receive may receive statistical data and other data from one or more of the data collectors 612, the sort and statistics engine 622, the modeling engine 624 and the traffic profiler 626. The manager 660 may format the statistical data for human or machine use. The manager 660 may format the statistical data, prepare it for display and/or prepare the statistical data in an appropriate format for output. In addition, the manager 660 may provide an interface that allows users the ability to view the content of server logs on remote servers.

With regard to all of the network testing systems described herein, additional and fewer units, chassis, blocks, communication lines, modules or other arrangement of software, hardware, firmware and data structures may be used to achieve the system and techniques described herein.

Methods

Figure 7:
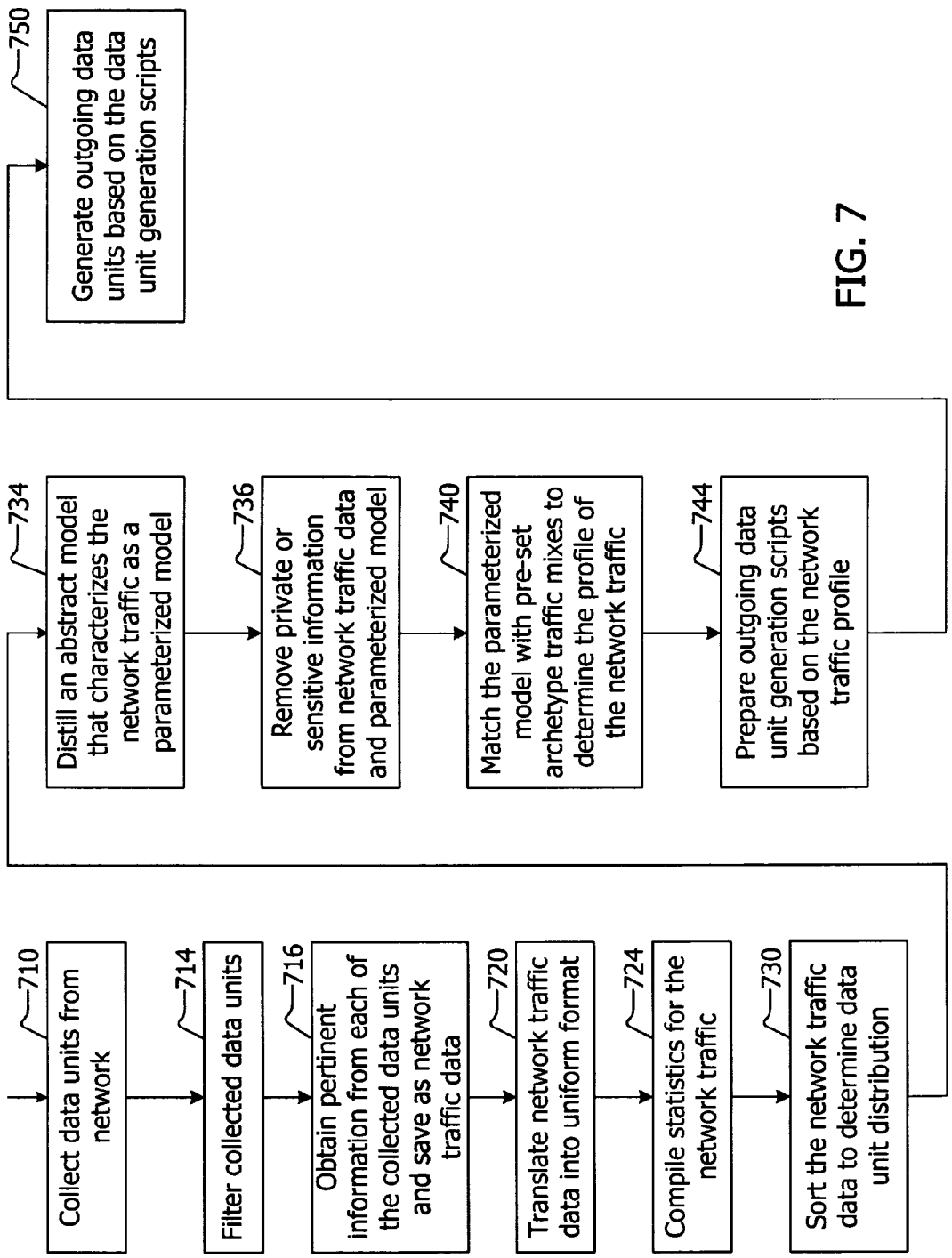
FIG. 7 is a flow chart of a method in accordance with the invention.

FIG. 7 is a flow chart of a method in accordance with the invention. Data units may be collected from a network, as shown in block 710. The network is typically a production network. The data units are filtered, as shown in block 714. The filtering may be achieved by filters that may be system defined and/or user defined. The filters may limit collection and review of data units based on specified characteristics such as size of the data units, layer of the data units, application that sent the data unit, protocol included in the data unit, source and/or destination addresses in the data unit, port specified in the data unit, flags specified in the data unit, and others. Pertinent information from each collected data units is obtained and saved as network traffic data, as shown in block 716. The pertinent information may be obtained by various plug-ins, modules or units, each of which may store the pertinent information in varying formats. The pertinent information for each of the data units is then translated into a uniform format, as shown in block 720. Statistics for the network traffic are then computed, as shown in block 724.

The network traffic data may be sorted to determine the data unit distribution, as shown in block 730. The distribution of network traffic may be evaluated by data unit size, data unit protocol type, data unit layer, data unit application, and other data unit attributes. A model that parameterizes the collected data units as a parameterized model is distilled, as shown in block 734. Private and other sensitive information may be removed from the network traffic data and/or the parameterized model, as shown in block 736. The parameterized model may be matched with pre-set network traffic archetype mixes to determine a profile of the network traffic, as shown in block 740. Outgoing data unit generation scripts may be prepared based on the network traffic profile, as shown in block 744.

Outgoing data units may be generated based on the data unit generation scripts, as shown in block 750.

Figure 8:
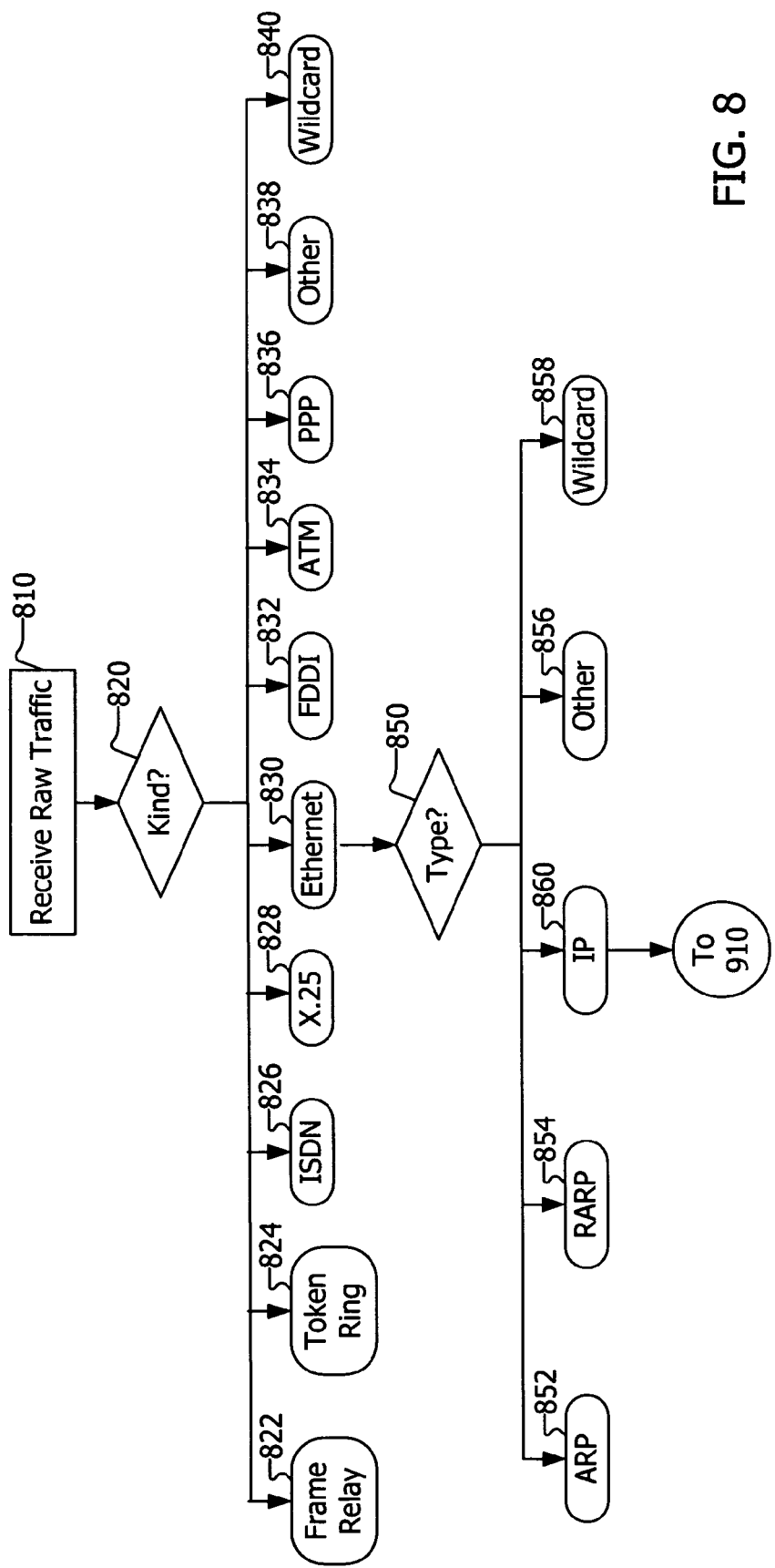
FIG. 8 is a flow chart of the actions taken in filtering network traffic in accordance with the invention.

FIG. 8 is a flow chart of filtering collected network traffic in accordance with the invention. Raw network traffic is received, as shown in block 810. The kind of data unit is then analyzed, as shown in block 820. The actions taken may then depend on the kind of data unit being reviewed. In various implementations, various actions may be taken based on whether the kind of data unit is a frame relay data unit, as shown in block 822, a token ring data unit, as shown in block 824, an ISDN data unit, as shown in block 826, an X.25 data unit, as shown in block 828, an Ethernet data unit, as shown in block 830, an FDDI data unit, as shown in block 832, an ATM data unit, as shown in block 834, a PPP data unit, as shown in block 836, an "other" kind of data unit, as shown in block 838, and a "wildcard" data unit, as shown in block 840. As used herein, "other" refers to known but kinds or types of data units that a fine granularity of information need not be maintained. As used herein, "wildcard" refers to unknown kinds or types of data units that are found in the network traffic.

When the kind of data unit is Ethernet, as shown in block 830, the data unit is further classified based on its type, as shown in block 850. Types of Ethernet data units include ARP data units, as shown in block 852, RARP data units, as shown in block 854, IP data units, as shown in block 860, "other" types of Ethernet data units, as shown in block 856, and "wildcard" or unknown types of Ethernet data units, as shown in block 858. When the type of Ethernet data unit is IP, the flow of actions continues with block 910 of FIG. 9. Other kinds of data units may be filtered in a similar, specialized manner based on the attributes of the particular kind of data unit.

Figure 9:
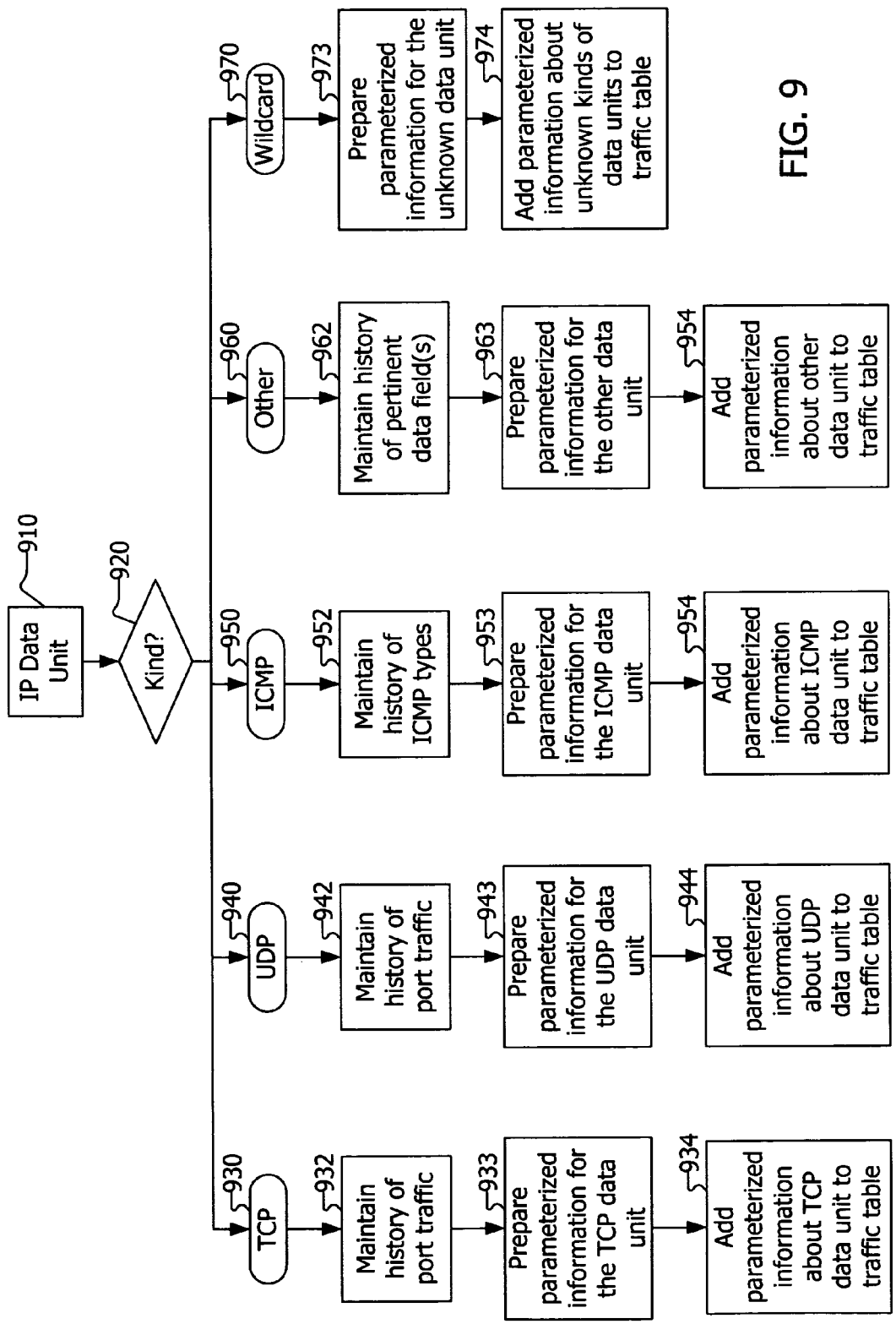
FIG. 9 is a flow chart of the actions taken in filtering Internet Protocol data units in accordance with the invention.

FIG. 9 is a flow chart of the actions taken in filtering IP data units. When an IP data unit is collected, as shown in block 910, the pertinent information for which statistics will be obtained is determined based on the kind of IP data unit, as shown in block 920.

If the kind of IP data unit is TCP, as shown in block 930 a history of the port used is maintained, as shown in block 932. Parameterized information about the TCP data unit is prepared, as shown in block 933. The parameterized information about the TCP data unit may be added to a traffic summary table, as shown in block 934, or other data structure used to store network traffic summary data. A network traffic summary table may store the network traffic data for each of the data units in a capture group.

If the kind of IP data unit is UDP, as shown in block 940 a history of port traffic is maintained, as shown in block 942. Parameterized information about the UDP data unit is prepared, as shown in block 943, and the parameterized information about the UDP data unit is added to the network traffic summary table, as shown in block 944.

If the kind of IP data unit is ICMP, as shown in block 950, history of the type of ICMP data unit is maintained, as shown in block 952. Parameterized information about the ICMP data unit is prepared, as shown in block 953, and the parameterized information about the ICMP data unit is added to the network traffic summary table, as shown in block 954.

If the kind of IP data unit is "other", as shown in block 960 a history of pertinent data fields of these other IP data units is maintained, as shown in block 962. Parameterized information about the other IP data unit is prepared, as shown in block 963, and the parameterized information about the other data unit is added to the network traffic summary table, as shown in block 964.

If the kind of IP data unit is "unknown" it may be considered a "wildcard", as shown in block 970. Parameterized information about the unknown kind of IP data unit is prepared, as shown in block 973, and the parameterized information about the unknown data unit is added to the network traffic summary table, as shown in block 974.

With regard to FIGS. 7, 8 and 9, additional and fewer steps may be taken, and the steps as shown may be combined or further refined to achieve the methods described herein.

Data Storage

FIG. 10 is a network traffic summary table 1000 in accordance with the invention. The summary table serves to summarize pertinent information concerning the network traffic. The summary table may also be considered a traffic distribution table. Basic raw data concerning data units included in the network traffic may be maintained in one or more data structures that may be viewed as a table. One summary table may be created for each capture group. The size of the summary tables may be system defined or user customizable. The summary table provides a parameterized view of network traffic in a particular capture group, and may be used to store data concerning multiple capture groups, or a summary of all captured network traffic.

The network traffic summary table 1000 may include source and destination IP addresses 1010 and 1012 contained in a data unit, protocol information 1016 such as the protocol 1020 used in the data unit, a port designator or port type 1022 specified in the data unit, and flags 1024 specified in the data unit. Example protocols include TCP, UDP, ICMP, and others. The protocols may correspond to the type of protocols discussed above regarding FIGS. 8 and 9. The port designator 1022 may be a range of ports, a list of ports, or a single port. The flags 1024 may vary based on the type of protocol 1020.

The number of data units 1030 having a size in a particular range may be maintained according to bins. That is, for those data units having particular IP addresses 1004 and/or the same protocol information 1016, a count of the data units by size may be maintained. For example, a first bin 1032 may include the raw count of the number of data units having size 1-63 bytes, a second bin 1034 may include the raw count of the number of data units having size 64-128 bytes, a third bin 1036 may include the raw count of the number of data units having size 128-255 bytes, a fourth bin 1038 may include the raw count of the number of data units having size 256-511 bytes, a fifth bin 1040 may include the raw count of the number of data units having size 512-1023 bytes, a sixth bin 1042 may include the raw count of the number of data units having size 1024-1518 bytes, and a seventh bin 1044 may include the raw count of the number of data units having the maximum size data unit.

To more efficiently store the information maintained in the summary table, the summary table may be implemented to conserve memory space usage, such as, for example, by using a hash table, and other data storage techniques.

In addition to or in place of the summary table, parameterized vectors of information based on each type of data unit may be maintained. For example, if the types of data units include TCP, UDP and ICMP data units, parameterized TCP representation vectors, parameterized UDP representation vectors, and parameterized ICMP representation vectors may be used, as well as others.

FIG. 11 is a representation vector 1100 of a TCP data unit in accordance with the invention. The representation vector 1100 may include fields for the layer 2 protocol type 1110, the layer 3 protocol type 1112, the type of IP service 1114, the source IP address 1116, the destination IP address 1118, the minimum TCP port 1120 which is the minimum of the source and destination TCP ports, a source/destination port bit 1122, a stuffing bit 1124, TCP flags 1126, and the data unit size 1128. The representation vector 1100 may be 128 bits wide. The size of the representation vector may vary in various implementations based on the information to be captured and other reasons, such as CPU word size, available memory for storage, and others. The representation vector 1100 is shown with designated 32 bit portions because a processor on a network card or a processor executing software to achieve the techniques described herein may have a 32-bit word. Other processors having other word sizes (e.g., 8, 16, 64 and others) may also be used.

The representation vector 1100 shown depicts an example an IP version 4 TCP data unit sent from IP address 10.0.0.1 to IP address 10.0.0.2, destination TCP port 80, using a standard IP type of service. In this example, layer-2 protocol type is IP v4 with the hexadecimal code 0x0800. Obtaining this information may require some processing. For example, the minimum TCP port requires extracting information regarding two ports (source and destination), and comparing them to find the minimum.

FIG. 12 is a representation vector 1200 of an ICMP data unit in accordance with the invention. The representation vector 1200 may include fields for the layer-2 protocol type 1210, the layer 3 protocol type 1212, the type of IP service 1214, the source IP address 1216, the destination IP address 1218, ICMP type code 1220, a stuffing bit 1222, and the data unit size 1224. The representation vector 1200 may be 128 bits wide. The size of the representation vector may vary in various implementations based on the information to be captured and other reasons, such as CPU word size, available memory for storage, and others. The representation vector 1200 is shown with designated 32-bit portions because a processor on a network card or a processor executing software to achieve the techniques described herein may have a 32-bit word. Other processors having other size word (e.g., 8, 16, 64 and others) may also be used.

The representation vector 1200 shown depicts an example a IP version 4 ICMP data unit sent from IP address 10.0.0.1 to IP address 10.0.0.3, using a standard IP type of service. In this example, layer 2 protocol type is IP v4 with the hexadecimal code 0x0800, and the layer 3 protocol type is 1 representing ICMP.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention.

It is claimed:

1. A system to automatically generate outgoing network traffic based on observed production network traffic, the system comprising at least one network card, the network card including at least one processor and memory, the system further comprising:

a data collector to automatically capture production network traffic and to compile network traffic data based on the captured production network traffic, the network traffic data including: distribution data comprising at least one of protocol distribution data, length distribution data, and transaction distribution data; header information comprising at least one of a group of most common addresses, a group of most common ports, and most common header data; and payload data a characterization engine to receive the production network traffic and the network traffic data from the data collector and to automatically prepare network traffic characterization data based on the production network traffic and the network traffic data, the network traffic characterization data including at least two of statistical indicators, a traffic model and traffic profile data, a feedback unit included in the characterization engine, the feedback unit to communicate with the data collector to automatically adjust the network traffic data compiled based on earlier captured production network traffic including successively refining the network traffic data compiled a script generator to receive the network traffic characterization data from the characterization engine and to automatically prepare a plurality of scripts based on the network traffic characterization data, each of the scripts associated with a type of network traffic modeled in the network traffic characterization data a traffic generator to automatically generate test network traffic based on the scripts, including multiplexing in the test network traffic groupings of data units, each grouping representing the type of network traffic specified in the scripts wherein the data collector, the characterization engine, the script generator and the traffic generator operate automatically without human intervention a manager coupled with at least the data collector and the characterization engine, the manager to obtain statistical data from at least one of the data collector and the characterization engine and to provide an interface to allow a user to view information about the captured network traffic, including providing at least one of reports, log files, charts, and graphs showing at least one of the network traffic characterization data and the statistical data.

2. The system of claim 1 wherein the characterization engine comprises a sort and statistics engine to prepare the statistical indicators based on the network traffic data a modeling engine to prepare the traffic model based on the statistical indicators a traffic profiler to generate the traffic profile data based on the traffic model and traffic mix profiles stored by the system.

3. The system of claim 2 wherein the characterization engine includes a model-tweaking unit to allow a user to edit the traffic model.

4. The system of claim 2 wherein the characterization engine includes a profile-editing unit to allow a user to edit the traffic profile data.

5. The system of claim 1 wherein the collector is configured to filter the network traffic based on filters and to translate the network traffic based on uniform format requirements.

6. The system of claim 5 wherein the filters are at least one of user defined and system defined.

7. The system of claim 1 wherein the characterization engine is configured to sanitize the network traffic data and the statistical indictors.

8. The system of claim 7 wherein to sanitize includes removing at least one of personal identifying information, passwords, bank account numbers, and credit card information.

9. The system of claim 1 wherein the data collector includes at least one data collection unit for each of a plurality of communications protocols supported by the system.

10. The system of claim 1 wherein the script generator includes at least one script generation unit for each of a plurality of communications protocols supported by the system.

11. The system of claim 1 wherein the traffic generator includes at least one traffic generation unit for each of a plurality of communications protocols supported by the system.

12. The system of claim 1 wherein the system supports a plurality of communications protocols.

13. The system of claim 12 wherein the plurality of communication protocols includes at least Ethernet, User Datagram Protocol (UDP), Transmission Control Protocol (TCP), and Hypertext Transfer Protocol (HTTP).

14. A system to automatically generate outgoing network traffic based on observed production network traffic, the system comprising at least one network card, the network card including at least one processor and memory, the system further comprising:

a data collector to automatically capture production network traffic and to compile network traffic data based on the captured network traffic, the network traffic data including distribution comprising: at least one of protocol distribution data, length distribution data, and transaction distribution data; header information comprising at least one of a group of most common addresses, a group of most common ports, and most common header data; and payload data a feedback unit to receive captured production network traffic from the data collector and to communicate with the data collector to automatically adjust the network traffic data compiled based on the captured production network traffic including successively refining the network traffic data compiled a sort and statistics engine to receive the network traffic data from the data collector and to automatically prepare statistical indicators based on the network traffic data a modeling engine to receive the statistical indicators from the sort and statistics engine and to automatically prepare a traffic model based on the statistical indicators a traffic profiler to receive the traffic model from the modeling engine and to automatically generate traffic profile data based on the traffic model and traffic mix profiles stored by the system a script generator to receive the traffic profile data from the traffic profiler and to automatically prepare a plurality of scripts based on the traffic profile data, each of the scripts associated with a type of network traffic a traffic generator to automatically generate test network traffic based on the scripts, including multiplexing in the test network traffic groupings of data units, each grouping representing the type of network traffic specified in the scripts wherein the data collector, the feedback unit, the sort and statistics engine, the modeling engine, the traffic profiler, the script generator and the traffic generator operate automatically without human intervention a manager coupled with the data collector, the feedback unit, the sort and statistics engine, the modeling engine, the traffic profiler, the script generator and the traffic generator, the manager to provide a first interface to allow a user to view information about the functioning of the system, including providing at least one of reports, log files, charts, and graphs showing at least one of the network traffic characterization data, the traffic profile data, the traffic model, and the statistical indicators.

15. The system of claim 14 wherein the data collector is configured to filter the network traffic based on filters and to translate the network traffic based on uniform format requirements.

16. The system of claim 14 wherein the modeling engine is configured to sanitize the network traffic data and the statistical indictors.

17. The system of claim 14 wherein to sanitize includes removing at least one of personal identifying information, passwords, bank account numbers, and credit card information.

18. The system of claim 14 wherein the modeling engine includes a model-tweaking unit to allow a user to edit the traffic model.

19. The system of claim 14 wherein the traffic profiler includes a profile-editing unit to allow a user to edit the traffic profile data.

20. The system of claim 14 wherein the script generator includes at least one script generation unit for each of the communications protocols supported by the system.

21. The system of claim 14 wherein the traffic generator includes at least one traffic generation unit for each of the communications protocols supported by the system.

22. The system of claim 14 wherein the system supports a plurality of communications protocols.

23. The system of claim 22 wherein the plurality of communication protocols includes at least Ethernet, User Datagram Protocol (UDP), Transmission Control Protocol (TCP), and Hypertext Transfer Protocol (HTTP).

24. A method to automatically generate outgoing network traffic based on observed production network traffic, the method performed by a network testing system, the method comprising:
the network testing system capturing production network traffic
the network testing system compiling network traffic data based on the captured production network traffic, the network traffic data including: distribution data comprising at least one of protocol distribution data, length distribution data, and transaction distribution data; header information comprising at least one of a group of most common addresses, a group of most common ports, and most common header data; and payload data
the network testing system automatically adjusting the network traffic data compiled based on earlier captured production network traffic including successively refining the network traffic data compiled
the network testing system preparing network traffic characterization data based on the production network traffic and the network traffic data the network traffic characterization data including at least two of statistical indicators, a traffic model and traffic profile data,
the network testing system generating a plurality of scripts based on the network traffic characterization data, each of the scripts associated with a type of network traffic modeled in the network traffic characterization data
the network testing system generating test network traffic based on the scripts, including multiplexing in the test network traffic groupings of data units, each grouping representing the type of network traffic specified in the scripts
wherein the capturing, the compiling, the preparing, the generating scripts, and the generating network traffic are performed by the network testing system automatically without human intervention.

25. The method of claim 24 wherein
the network testing system preparing network traffic characterization data includes
the network testing system preparing the statistical indicators based on the network traffic data
the network testing system preparing the traffic model based on the statistical indicators
the network testing system generating the traffic profile data based on the traffic model and system provided traffic mix profiles.

26. The method of claim 24 wherein
the network testing system capturing network traffic comprises the network testing system filtering the network traffic based on filters
the network testing system compiling network traffic data comprises the network testing system translating the network traffic based on uniform format requirements.

27. The method of claim 24 further comprising
the network testing system sanitizing the network traffic data and the statistical indicators.

28. The method of claim 27 wherein the network testing system sanitizing the network traffic data and the statistical indicators includes the network testing system removing at least one of personal identifying information, passwords, bank account numbers, and credit card information.

29. The method of claim 24 wherein the production network traffic includes a plurality of data units adhering to a plurality of communications protocols.

30. The method of claim 24 wherein the outgoing network traffic includes a plurality of data units adhering to a plurality of communications protocols.

31. The method of claim 30 wherein the plurality of communications protocols includes at least Ethernet, User Datagram Protocol (UDP), Transmission Control Protocol (TCP), and Hypertext Transfer Protocol (HTTP).

32. A non-transitory machine readable medium having instructions stored thereon which when executed cause a network testing system to perform operations comprising:
capturing production network traffic
compiling network traffic data based on the production network traffic, the network traffic data including: distribution data comprising at least one of protocol distribution data, length distribution data, and transaction distribution data; header information comprising at least one of a group of most common addresses, a group of most common ports, and most common header data; and payload data
automatically adjusting the network traffic data compiled based on earlier captured production network traffic, the network traffic characterization data including at least two of statistical indicators, a traffic model and traffic profile data including successively refining the network traffic data compiled
preparing network traffic characterization data based on the production network traffic and the network traffic data
generating a plurality of scripts based on the network traffic characterization data, each of the scripts associated with a type of network traffic modeled in the network traffic characterization data
generating test network traffic based on the scripts, including multiplexing in the test network traffic groupings of data units, each grouping representing the type of network traffic specified in the scripts
wherein the capturing, the compiling, the preparing, the generating scripts, and the generating network traffic are performed automatically without human intervention.

33. The non-transitory machine readable medium of claim 32 wherein
preparing network traffic characterization data includes
preparing the statistical indicators based on the network traffic data preparing the traffic model based on the statistical indicators generating the traffic profile data based on the traffic model and system provided traffic mix profiles.

34. The non-transitory machine readable medium of claim 32 wherein
the capturing network traffic comprises filtering the network traffic based on filters
the compiling network traffic data comprises translating the network traffic based on uniform format requirements.

35. The non-transitory machine readable medium of claim 32 having further instructions which when executed cause the processor to perform further operations comprising
sanitizing the network traffic data and the statistical indicators.

36. The non-transitory machine readable medium of claim 35 wherein the sanitizing includes removing at least one of personal identifying information, passwords, bank account numbers, and credit card information.

37. The non-transitory machine readable medium of claim 32 wherein the production network traffic includes a plurality of data units adhering to a plurality of communications protocols.

38. The non-transitory machine readable medium of claim 32 wherein the outgoing network traffic includes a plurality of data units adhering to a plurality of communications protocols.

39. The non-transitory machine readable medium of claim 38 wherein the plurality of communications protocols includes at least Ethernet, User Datagram Protocol (UDP), Transmission Control Protocol (TCP), and Hypertext Transfer Protocol (HTTP).

40. The non-transitory machine readable medium of claim 35 coupled with a network testing system.

41. The non-transitory machine readable medium of claim 40 wherein the network testing system is coupled to a production network.

42. The non-transitory machine readable medium of claim 41 wherein the network testing system is coupled to a test network.

43. A system to automatically generate outgoing network traffic scripts based on production network traffic, the system comprising at least one network card, the network card including at least one processor and memory, the system further comprising:
a collector to receive network traffic data based on the production network traffic
a characterization engine to receive the network traffic data from the collector and to prepare a network traffic characterization based on the network traffic data, the network traffic data including: distribution data comprising at least one of protocol distribution data, length distribution data, and transaction distribution data; header information comprising at least one of a group of most common addresses, a group of most common ports, and most common header data; and payload data
a feedback unit included in the characterization engine, the feedback unit to communicate with the collector to automatically adjust the network traffic data compiled based on earlier captured production network traffic including successively refining the network traffic data compiled
a script generator to receive the network traffic characterization from the characterization engine and to prepare a plurality of scripts based on the network traffic characterization, the network traffic characterization including at least two of statistical indicators, a traffic model and traffic profile data, each of the scripts associated with a type of network traffic modeled in the network traffic characterization
wherein the collector, the characterization engine and the script generator operate automatically with human intervention
a manager coupled with at least the collector and the characterization engine, the manager to obtain statistical data from at least one of the collector and the characterization engine and to provide an interface to allow a user to view information about the system, including providing at least one of reports, log files, charts, and graphs showing at least one of the network traffic characterization data, network traffic data and the statistical data
a traffic generator to automatically generate without human intervention test network traffic based on the scripts, including multiplexing in the test network traffic groupings of data units, each grouping representing the type of network traffic specified in the scripts.

44. The system of claim 43 wherein
the characterization engine comprises
a sort and statistics engine to prepare the statistical indicators based on the network traffic data
a modeling engine to prepare the traffic model based on the statistical indicators
a traffic profiler to generate the traffic profile data based on the traffic model and traffic mix profiles stored by the system.

45. The system of claim 44 wherein the modeling engine includes a model tweaking unit to allow a user to edit the traffic model.

46. The system of claim 44 wherein the traffic profiler includes a profile editing unit to allow a user to edit the traffic profile data.

47. The system of claim 43 wherein the data collector includes at least one data collection unit for each of a plurality of communications protocols supported by the system.

48. The system of claim 43 wherein the collector is configured to capture network traffic and to compile additional network traffic data based on the captured network traffic.

49. The system of claim 43 wherein the collector is configured to filter the network traffic data based on filters and to translate the network traffic data based on uniform format requirements.

50. The system of claim 43 wherein the script generator includes at least one script generation unit for each of a plurality of communications protocols supported by the system.

51. The system of claim 43 wherein the traffic generator includes at least one traffic generation unit for each of a plurality of communications protocols supported by the system.

52. The system of claim 43 wherein the system supports a plurality of communications protocols.

53. The system of claim 52 wherein the plurality of communication protocols includes at least Ethernet, User Datagram Protocol (UDP), Transmission Control Protocol (TCP), and Hypertext Transfer Protocol (HTTP).

54. A method to automatically generate outgoing network traffic scripts based on production network traffic, the method performed by a network testing system, the method comprising:
the network testing system receiving network traffic data based on production network traffic, the network traffic data including: distribution data comprising at least one of protocol distribution data, length distribution data, and transaction distribution data; header information comprising at least one of a group of most common addresses, a group of most common ports, and most common header data; and payload data the network testing system automatically adjusting the network traffic data based on earlier captured production network traffic including successively refining the network traffic data compiled the network testing system preparing a network traffic characterization based on the network traffic data, the network traffic characterization including at least two of statistical indicators, a traffic model and traffic profile data, the network testing system automatically preparing without human intervention outgoing network traffic scripts based on the network traffic characterization, each of the scripts associated with a type of network traffic modeled in the network traffic characterization the network testing system automatically generating without human intervention test network traffic based on the scripts, including multiplexing in the test network traffic groupings of data units, each grouping representing the type of network traffic specified in the scripts.

55. The method of claim 54 further comprising:

the network testing system automatically capturing without human intervention additional production network traffic the network testing system automatically compiling without human intervention additional network traffic data based on the additional network traffic.

56. The method of claim 54 wherein the network testing system preparing the network traffic characterization includes the network testing system preparing the statistical indicators based on the network traffic data the network testing system preparing the traffic model based on the statistical indicators the network testing system generating the traffic profile data based on the traffic model and system provided traffic mix profiles.

57. The method of claim 54 wherein the network testing system receiving network traffic data comprises the network testing system filtering the network traffic data based on filters the network testing system translating the network traffic based on uniform format requirements.

58. The method of claim 54 wherein the network traffic data is based on a plurality of data units adhering to a plurality of communications protocols.

59. The method of claim 55 wherein the test network traffic includes a plurality of data units adhering to a plurality of communications protocols.

60. The method of claim 54 wherein the plurality of communications protocols includes at least Ethernet, User Datagram Protocol (UDP), Transmission Control Protocol (TCP), and Hypertext Transfer Protocol (HTTP).

* * * * *